July 11, 1967

F. TEMPLE 3,330,296

ANGLE COCK HAVING REMOVABLE VALVE UNIT

Filed June 11, 1964

INVENTOR.
FRED TEMPLE
BY
Ralph W. McIntire, Jr.

ATTORNEY

_United States Patent Office_

3,330,296
Patented July 11, 1967

3,330,296
ANGLE COCK HAVING REMOVABLE
VALVE UNIT
Fred Temple, Pittsburgh, Pa., assignor to Westinghouse
Air Brake Company, Wilmerding, Pa., a corporation of
Pennsylvania
Filed June 11, 1964, Ser. No. 374,486
6 Claims. (Cl. 137—454.2)

This invention relates generally to angle cock devices, and relates particularly to such devices having a structure facilitating quick and easy removal and replacement of the valve mechanism sub-assembly, relative to the valve body in which it is disposed, without removing the latter from its installation.

According to the well-known construction of angle cock devices, the same generally comprises a body or casing having a tapered aperture therein extending transversely of a fluid passage, a tapered bushing press-fitted in said aperture, a tapered plug seated in said bushing and having at the small end thereof a shaft extending exteriorly of the casing, a handle on the shaft, a screw cap or the like covering the tapered aperture at the large end of the plug, and a spring disposed between the cap and plug to bias the plug into seating engagement with the bushing, such as that shown in Patent No. 1,131,224 patented Mar. 9, 1915, and assigned to the assignee of the present invention, which patent is selected for illustrative purposes because of its elementary simplicity and minimum number of component parts.

Heretofore, to effect repair or replacement of angle cock devices, such as those above described, required either removal of the complete device, including the valve body, from its installation, or complete disassembly of the angle cock device at the site of installation, either method involving considerable down-time for the angle cock and its associated apparatus.

It is the object of the present invention to provide in an angle cock valve a structure which provides a unitary sub-assembly of all the elements of the angle cock device, with the exception of the valve body, to facilitate quick and easy removal and replacement of damaged or worn parts without disassembly of the sub-assembly and without removing the valve body from its installation. This object is achieved by disposing both the handle shaft and the spring biasing mechanism on the large end of the tapered plug, with the spring compressed between the plug end and a cover removably attached to a flange on the wide end of the tapered bushing. Thus, the plug and spring are held in assembled relationship with and between the bushing and a cover and comprise a unitary sub-assembly which is insertable into and removable from the tapered bore in an angle cock body. The bushing flange and cover overlie the exterior of the valve body for attachment thereto. The unit sub-assembly is anchored to the body in operating position within the tapered bore by means of three screws extending through the cover and flange into the valve body around the large end of the tapered bore. In the event any part or parts of the machine are worn or damaged or otherwise in need of repair, the screws are removed and the entire sub-assembly is quickly removed as a unit from the angle cock body, and another identical sub-assembly is inserted therein and screwed into position. The screws are irregularly spaced around the periphery of the cover to prevent installation of the sub-assembly in the bore in any position other than the one in which the bushing apertures are aligned with the passages communicating with the bore. The worn and damaged unit then may be transported as a unit for disassembly and repair at a repair site remotely disposed from the point of installation of the angle cock valve.

These and other objects will be more readily apparent when taken in conjunction with the following description and the accompanying drawing, in which.

Figure 1:
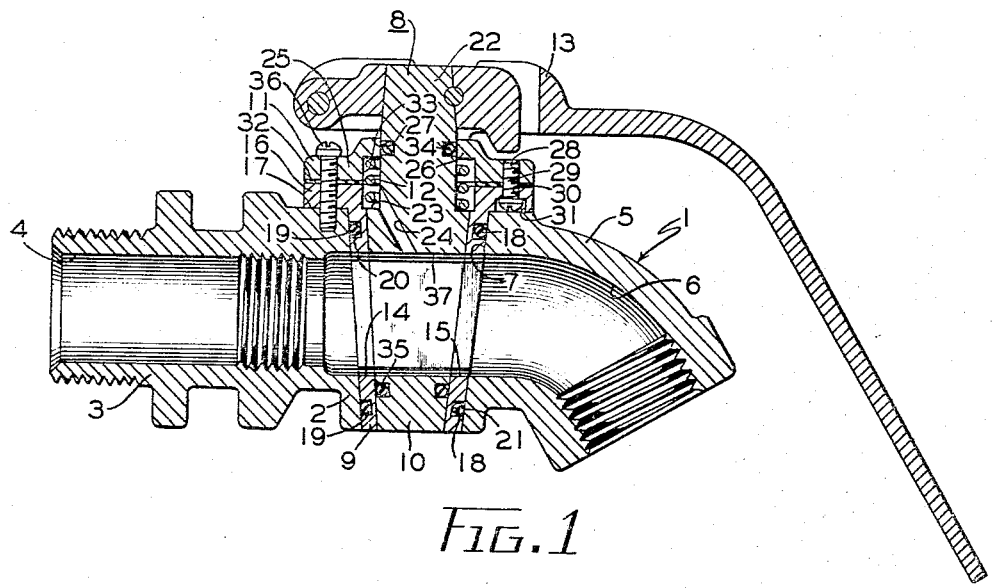
FIG. 1 is a sectional view of an angle cock device showing the invention.

Referring now to the drawing, there is shown an angle cock valve device 1 having a body or casing 2 including a tapped extension 3 having a main passage 4 therein adapted for connection to a brake pipe or similar apparatus, and an opposite tapped extension 5 having a passage 6 therein adapted for connection to a hose and coupling assembly or similar apparatus. The passages 4 and 6 open into opposite sides of a central tapered bore 7 extending entirely through the body 2 transversely of the passages 4 and 6.

A unitary sub-assembly, generally indicated at 8, is adapted to be removably secured as a unit in said tapered bore 7 and comprises a tapered bushing 9, a tapered plug 10 seated in the bushing 9, a cover 11 removably attached to bushing 9, a plug biasing spring 12 disposed between the plug and the cover, and a handle 13 attached to the plug.

Figure 2:
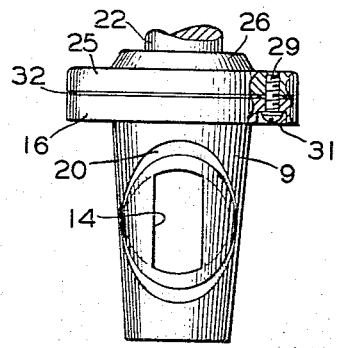
FIG. 2 is a side elevational view of a sub-assembly of the angle cock device of FIG. 1.

The tapered bushing 9 is seated in the tapered bore 7 and inclues a pair of opposing passages 14, 15 therein for mating with the openings to passages 4 and 6, respectively, when the bushing is disposed in the tapered bore 7, as shown. A laterally extending flange member 16 on the periphery of the large end of the bushing 9 overlies a planar portion 17 on the external surface of body 2, which planar portion circumscribes the large end opening of bore 7 to facilitate attachment of the assembly 8 to the body 2, in a manner hereinafter described. A pair of sealing rings 18 and 19 are provided in suitable grooves 20, 21, respectively, disposed on opposite sides of the outer periphery of the bushing 9, each ring encircling one of the openings 14, 15 to effect a complete seal between each passage 4 and 6 and the outer periphery of bushing 9. In FIG. 2, the passage 4 in body 2 is shown in phantom to illustrate the relative position thereof with respect to groove 20 in the bushing 9 when the bushing is installed in the body.

The tapered plug 10 is seated in the bushing 9 and has a passage 37 extending therethrough transversely of the plug axis for alignment at its ends with the bushing apertures 14 and 15 and the passages 4 and 6 when the plug is rotated about its axis to the position shown. In known fashion, communication between passages 4 and 6 is terminated when the plug 10 is rotated about its axis to disrupt communication between passage 37 in the plug and apertures 14, 15 in the bushing 9. An integral shaft member 22 extends axially upward from the plug 10, forming a transverse shoulder 23 between the plug 10 and shaft 22. The conventional handle 13 is detachably received on the upper end of shaft 22 in any suitable conventional manner. A bore 24 communicates the passage 21 in plug 10 with the external surface of the plug 10 at shoulder 23 for pressure seating of plug 10 in bushing 9, as hereinafter described.

The disc-like cover 11 comprises a flat peripheral portion 25 and an axially offset central portion 26. The peripheral portion 25 is seated on the top of flange 16 of bushing 9. The central portion 26 is apertured at 27 for sleeving the cover onto its seat over the shaft 22. The peripheral portion 25 is threaded at a plurality of apertures 28 (only one shown) to receive therein screws 29 (only one shown) extending upwardly through a threaded bore 30 in a recess 31 in the botom of flange 16 for effecting a sealing relationship between the periphery 25 of cover 11, a gasket 32 and the upper side of flange 16. When the cover 11 is so sealed to the flange 16 of bushing 9, a chamber 33 is formed between the inside of the cover 11, the inner periphery of flange 16, the shaft 22 and the shoulder 23 of plug 10, which chamber is communicated with the passage 21 in the plug 10 by way of the aforementioned bore 24 to receive fluid under pressure from passage 21, thus providing a pressure for assisting in seating the plug 10 in bushing 9. The spring 12 encircles shaft 22 and is compressed between the inside of cover 11 and shoulder 23 to provide the basic force for seating plug 10 in bushing 9.

A sealing O-ring member 34 is disposed in a suitable groove in shaft 22 to prevent escape of fluid under pressure to the atmosphere through aperture 27 in the cover 11. A sealing O-ring member 35 is provided in a suitable groove in the lower end of plug 10 to prevent escape of fluid from passage 21 between the inner periphery of bushing 9 and plug 10 to the atmosphere.

From the foregoing, it is seen that the bushing 9, plug 10, cover 11 and spring 12 may be preassembled as a unitary sub-assembly 8 by means of screws 29 which fixedly dispose the spring and plug between the bushing and cover, whereafter the sub-asembly 8 is assembled with body 2 by disposing bushing 9 into tapered bore 7. Unit 8 is removably affixed in place by means of screws 36 (only one shown) extending through the cover 11, gasket 32 and flange 16 of bushing 9 into the planar portion 17 on the exterior of body 2. The screws 36, and their associated apertures in unit 8, may be irregularly spaced around the periphery of unit 8 with respect to one another to prevent installation of the unit 8 on the body 2, except in its predetermined proper position, for aligning apertures 14 and 15 in bushing 9 with passages 4 and 6 in body 2.

In the event the need arises for repair of the elements in the angle cock device 1, screws 36 are removed and the entire unit 8 is removed and replaced by an identical unit, and the screws 36 are reinserted to fix the unit 8 within the body 2, to thus facilitate minimum downtime of the angle cock 1, and without removing the valve body 2 from its installation.

Having now described the invention, what I claim as new and desire to secure by Letters Patent, is:

1. An angle cock comprising:
   (a) a valve body having a tapered bore therein and passages communicating with said bore,
   (b) a tapered bushing seated in said bore and having apertures therein registering with said passages, and further having a peripheral flange on the larger end thereof overlying the exterior surface of said body on the periphery of said bore,
   (c) a cover sealingly seated on said flange to close the larger end of said bore,
   (d) means attaching said cover to said flange,
   (e) a plug valve seated in said bushing and having an axially extending shaft on the larger end thereof extending through said cover for effecting rotation of said plug valve, and
   (f) means attaching said cover and said bushing to said body to hold said bushing removably fixed in said bore, comprising screw means extending through said cover and said flange into said body.

2. The angle cock recited in claim 1, in which said means attaching said cover to said flange comprises screw means.

3. An angle cock comprising:
   (a) a valve body having a tapered bore therein and passages communicating with said bore,
   (b) a tapered bushing seated in said bore and including therein apertures registering with said passages, a groove encircling each aperture on the outside diameter thereof, a sealing ring seated in each groove, a peripheral flange on the larger end of the bushing overlying the exterior surface of the body,
   (c) a cover sealingly seated on said flange to close the larger end of the bore,
   (d) a tapered plug valve seated in said bushing, said plug valve having passage means therethrough for intercommunicating said passages or preventing communication between said passages depending upon the rotative position of the plug valve in the bushing, and having an axially extending shaft on the larger end thereof extending through said cover for effecting rotation of said plug valve, said shaft having a diameter smaller than the larger end of said plug valve forming a shoulder at the junction of the plug valve with the shaft,
   (e) means detachably securing said cover to said flange,
   (f) a chamber formed by said cover, said flange, said shoulder and said shaft,
   (g) second passage means in said plug communicating said passage means with said chamber,
   (h) spring means compressed between said cover and said shoulder biasing said plug valve into seating engagement with said bushing, and
   (i) screw means extending through said cover and said flange into said body to removably secure the bushing in said bore.

4. The angle cock, of claim 3, in which said screw means are irregularly spaced from each other.

5. An angle cock comprising:
   (a) a body member having a through passage and a tapered bore transverse to and intersecting said passage,
   (b) a valve sub-assembly adapted for installation in and removal from said bore as a unit, said sub-assembly including:
      (i) a tapered bushing sealingly seatable within said bore and having at its larger end a flange overlying the periphery of the larger opening of said bore and having apertures therein for registering with said passage when the bushing is seated in the bore,
      (ii) a tapered plug valve element conforming to and seated within said bushing, said plug valve element having a shaft of reduced diameter extending therefrom by means of which to rotate said valve element to different rotary positions to open and close the connection between portions of said passage on the opposite side of said bore, and a shoulder surrounding said shaft,
      (iii) a cover having a central aperture through which said shaft extends and sealingly secured to said flange,
      (iv) spring means interposed between said cover and said shoulder for biasing said valve element into seating contact with said bushing, and
   (c) means extending through said cover and said flange and into said body for removably securing said valve subassembly to said body.

6. An angle cock comprising:
(a) a valve body having a tapered bore therein and passages communicating with said bore,
(b) a tapered bushing seated in said bore and having apertures therein registering with said passages, and further having a peripheral flange on the larger end thereof overlying the exterior surface of said body of the periphery of said bore,
(c) a cover sealingly seated on said flange to close the larger end of said bore,
(d) a plug valve seated in said bushing and having an axially extending shaft on the larger end thereof extending through said cover for effecting rotation of said plug valve,
(e) means for attaching said cover and said bushing to said body to hold said bushing removably fixed in said bore, comprising a plurality of screws irregularly spaced from each other and extending through said cover and said flange into said body.

References Cited

UNITED STATES PATENTS

| | | | |
|---|---|---|---|
| 860,217 | 7/1907 | Jackson | 137—454.6 |
| 2,127,679 | 8/1938 | Dudley | 251—184 X |
| 2,658,715 | 11/1953 | Kistner | 137—454.6 X |
| 2,954,961 | 10/1960 | Stogner | 251—312 |
| 3,069,130 | 12/1962 | Grove | 251—367 X |

FOREIGN PATENTS 453,472   12/1927   Germany.

WILLIAM F. O'DEA, *Primary Examiner.*

HAROLD WEAKLEY, *Examiner.*